(12) United States Patent
Song et al.

(10) Patent No.: US 12,240,407 B2
(45) Date of Patent: Mar. 4, 2025

(54) SHOULDER AIRBAG AND AIRBAG CUSHION THEREOF

(71) Applicant: HYUNDAI MOBIS CO., LTD., Seoul (KR)

(72) Inventors: Jiwoon Song, Yongin-si (KR); Dong Gil Lee, Yongin-si (KR); Sang Won Hwangbo, Yongin-si (KR); Byung Ho Min, Yongin-si (KR); Jae Jun Harm, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/465,730

(22) Filed: Sep. 12, 2023

(65) Prior Publication Data

US 2024/0092305 A1   Mar. 21, 2024

(30) Foreign Application Priority Data

Sep. 21, 2022  (KR) ........................ 10-2022-0119458

(51) Int. Cl.
| | |
|---|---|
| *B60R 21/233* | (2006.01) |
| *B60R 21/207* | (2006.01) |
| *B60R 21/237* | (2006.01) |

(52) U.S. Cl.
CPC .......... *B60R 21/233* (2013.01); *B60R 21/207* (2013.01); *B60R 21/237* (2013.01); *B60R 2021/23308* (2013.01); *B60R 2021/23324* (2013.01)

(58) Field of Classification Search
CPC ... B60R 21/233; B60R 21/207; B60R 21/237; B60R 2021/23308; B60R 2021/23324; B60R 2021/23316
See application file for complete search history.

(56) References Cited

U.S. PATENT DOCUMENTS

| | | | |
|---|---|---|---|
| 11,230,250 B2 * | 1/2022 | Sturm | ................. B60R 21/2338 |
| 11,345,305 B2 | 5/2022 | Fischer et al. | |
| 2017/0291564 A1 * | 10/2017 | Ohmi | ..................... B60N 2/838 |

* cited by examiner

*Primary Examiner* — Jason D Shanske
*Assistant Examiner* — Matthew James O'Neill
(74) *Attorney, Agent, or Firm* — NovoTechIP International PLLC

(57) ABSTRACT

Disclosed are a shoulder airbag and an airbag cushion thereof that are capable of restricting an occupant from being moved upward along a seatback and from being abruptly pushed in a direction away from a collision side of a vehicle when vehicle collision occurs, thereby safely protecting the occupant. The shoulder airbag includes an airbag cushion mounted in a seatback and configured to be deployed so as to cover each of the shoulders of an occupant sitting in a seat in three axis directions.

10 Claims, 4 Drawing Sheets

SHOULDER AIRBAG AND AIRBAG CUSHION THEREOF

CROSS-REFERENCE TO RELATED APPLICATIONS

This application claims the priority benefit of Korean Patent Application No. 10-2022-0119458, filed on Sep. 21, 2022, in the Korean Intellectual Property Office, the disclosure of which is incorporated herein by reference.

TECHNICAL FIELD

The present invention relates to a shoulder airbag and an airbag cushion thereof that are capable of restricting an occupant from being moved upward along a seatback and from being abruptly pushed in a direction away from a collision side of a vehicle when vehicle collision occurs, thereby safely protecting the occupant.

BACKGROUND

Airbags protect occupants from impact in the event of a vehicle accident by properly inflating airbag cushions, thus reducing or preventing the risk of injury. The inflating behavior of airbag cushions plays a very important role in securing the safety of occupants.

When front collision occurs in a recline mode (a mode in which an occupant sits back, with a seatback reclined), an airbag may not properly protect the occupant due to a phenomenon that the occupant is moved upward along the seatback, i.e. ramping-up behavior of the occupant.

The information disclosed in this Background of the Invention section is only for enhancement of understanding of the general background of the invention, and should not be taken as an acknowledgement or any form of suggestion that this information forms the related art already known to a person skilled in the art.

SUMMARY

Therefore, the present invention has been made in view of the above problems, and it is an object of the present invention to provide a shoulder airbag and an airbag cushion thereof that are capable of restricting an occupant from being moved upward along a seatback and from being abruptly pushed in a direction away from a collision side of a vehicle when vehicle collision occurs, thereby safely protecting the occupant.

In accordance with an aspect of the present invention, the above and other objects can be accomplished by the provision of a shoulder airbag including an airbag cushion mounted in a seatback and configured to be deployed so as to cover each of the shoulders of an occupant sitting in a seat in three axis directions.

The airbag cushion may be deployed so as to cover the front portion, side portion, and upper portion of each of the shoulders of the occupant.

The airbag cushion may include a first chamber formed in a shape covering each of the shoulders in a first axis direction, a second chamber formed in a shape covering each of the shoulders in a second axis direction, and a third chamber including a first portion extending from the first chamber and formed in a shape covering a portion of each of the shoulders in a third axis direction and a second portion extending from the second chamber and formed in a shape covering the remaining portion of each of the shoulders in the third axis direction.

The first portion extending from the first chamber and the second portion extending from the second chamber may be fixed to each other along the boundary therebetween to form the third chamber.

The first chamber may be configured to cover the side portion of each of the shoulders, the second chamber may be configured to cover the upper portion of each of the shoulders, and the third chamber may be configured to cover the front portion of each of the shoulders.

The first chamber may be configured to cover the side portion of each of the shoulders, the second chamber may be configured to cover the front portion of each of the shoulders, and the third chamber may be configured to cover the upper portion of each of the shoulders.

The first chamber may be configured to receive gas first, and the first chamber, the second chamber, and the third chamber are in fluid communication with each other so that the airbag cushion is inflated.

The first chamber, the second chamber, and the third chamber may be folded with respect to each other such that the first chamber and the second chamber are perpendicular to each other, the second chamber and the third chamber are perpendicular to each other, and the third chamber and the first chamber are perpendicular to each other.

The first chamber, the second chamber, and the third chamber may be folded with respect to each other such that the first chamber and the second chamber are perpendicular to each other, the first chamber and the portion extending from the first chamber are perpendicular to each other, and the second chamber and the portion extending from the second chamber are perpendicular to each other.

In accordance with another aspect of the present invention, there is provided an airbag cushion of a shoulder airbag, the airbag cushion including a first chamber configured to cover each of the shoulders of an occupant sitting in a seat in a first axis direction, a second chamber formed parallel to the first chamber in a lateral direction and configured to cover each of the shoulders of the occupant in a second axis direction, a first extended chamber extending from the first chamber in a predetermined direction and configured to cover a portion of each of the shoulders of the occupant in a third axis direction, and a second extended chamber extending from the second chamber in a predetermined direction and configured to cover the remaining portion of each of the shoulders of the occupant in the third axis direction, wherein the first extended chamber and the second extended chamber have edges facing each other and are fixed to each other along the edges thereof.

The edges of the first extended chamber and the second extended chamber may be formed obliquely relative to each other so as to face each other and may be fixed to each other.

The airbag cushion may be inflated and deployed in such a manner that the first chamber, the second chamber, the first extended chamber, and the second extended chamber are folded along a folding line formed between the first chamber and the second chamber, a folding line formed between the first chamber and the first extended chamber, and a folding line formed between the second chamber and the second extended chamber.

The first chamber, the second chamber, the first extended chamber, and the second extended chamber may communicate with each other along the folding line formed between the first chamber and the second chamber, the folding line formed between the first chamber and the first extended chamber, and the folding line formed between the second chamber and the second extended chamber.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION

Figure 1:
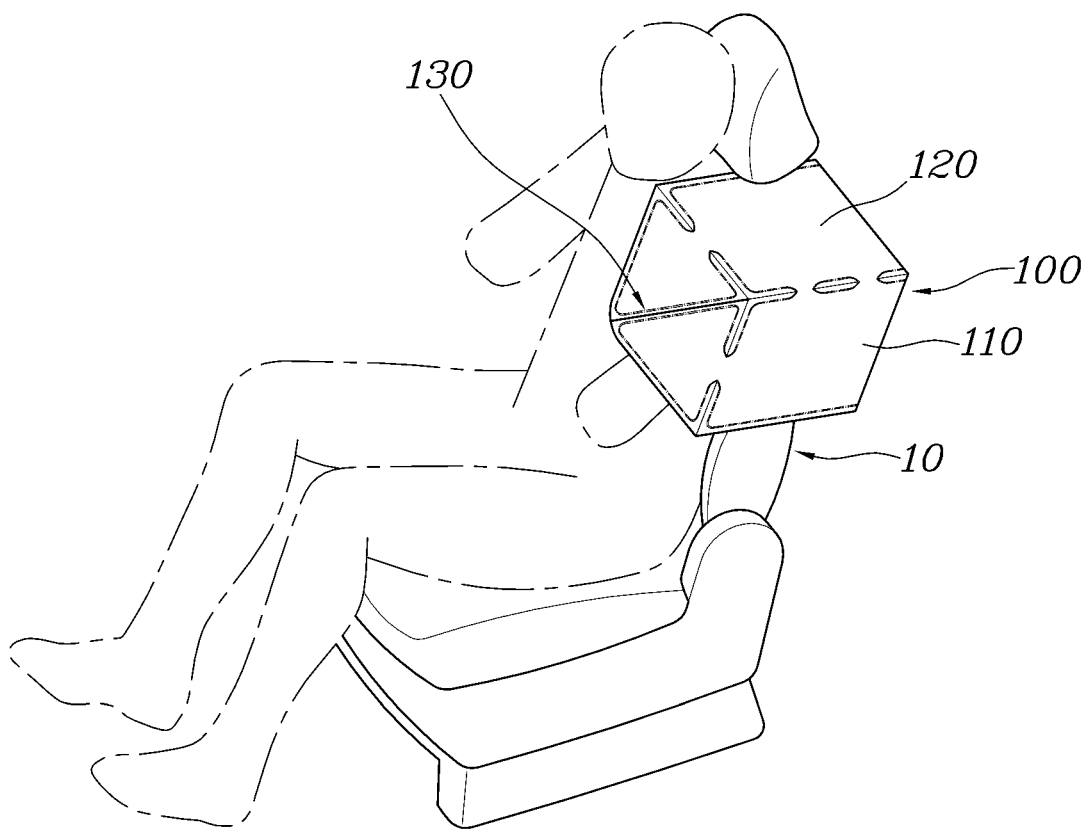
FIG. 1 is a view showing a state in which a shoulder airbag of the present invention is inflated and deployed around one of the shoulders of an occupant.

Hereinafter, the embodiments disclosed in the present specification will be described in detail with reference to the accompanying drawings, and the same or similar elements are denoted by the same reference numerals even though they are depicted in different drawings, and redundant descriptions thereof will be omitted.

In the following description, with respect to constituent elements used in the following description, the suffixes "module" and "unit" are used only in consideration of facilitation of description, and do not have mutually distinguished meanings or functions.

In the following description of the embodiments disclosed in the present specification, a detailed description of known functions and configurations incorporated herein will be omitted when the same may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and spirit of the present invention.

It will be understood that although the terms "first", "second", etc., may be used herein to describe various components, these components should not be limited by these terms. These terms are only used to distinguish one component from another component.

It will be understood that when a component is referred to as being "connected to" or "coupled to" another component, it may be directly connected to or coupled to another component, or intervening components may be present. On the other hand, when a component is referred to as being "directly connected to" or "directly coupled to" another component, there are no intervening components present.

As used herein, the singular form is intended to include the plural forms as well, unless the context clearly indicates otherwise.

It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

FIG. 1 is a view showing a state in which a shoulder airbag of the present invention is inflated and deployed around one of the shoulders of an occupant.

Referring to the drawing, the shoulder airbag of the present invention includes an airbag cushion 100 mounted in a seatback 10 and configured to be deployed so as to cover each of the shoulders of an occupant sitting in a seat in three axis directions.

For example, the shoulder airbag is mounted on the upper end of at least one of two side portions of the seatback 10.

The shoulder airbag is deployed so as to cover each of the shoulders of the occupant sitting in the seat in three axis directions, i.e., an X-axis direction, a Y-axis direction, and a Z-axis direction, thereby covering the entire area of each of the shoulders of the occupant.

In detail, the airbag cushion 100 may be deployed so as to cover the front portion, side portion, and upper portion of each of the shoulders of the occupant.

Accordingly, when vehicle collision occurs behind the seatback 10, a chamber covering the upper portion of each of the shoulders of the occupant prevents a phenomenon that the occupant is moved upward along the seatback 10, i.e., ramping-up behavior of the occupant, and a chamber covering the front portion of each of the shoulders of the occupant prevents the occupant from being pushed in a direction away from the seatback 10.

As a result, it is possible to eliminate not only the risk of injury due to the ramping-up behavior of the occupant but also the risk of injury due to forward movement of the occupant away from the seat, thus safely protecting the occupant.

According to the present invention, the airbag cushion 100 includes a first chamber 110 formed in a shape covering each of the shoulders in a first axis direction, a second chamber 120 formed in a shape covering each of the shoulders in a second axis direction, and a third chamber 130 including a first extended chamber 140 extending from the first chamber 110 and formed in a shape covering a portion of each of the shoulders in a third axis direction and a second extended chamber 150 extending from the second chamber 120 and formed in a shape covering the remaining portion of each of the shoulders in the third axis direction.

Figure 2:
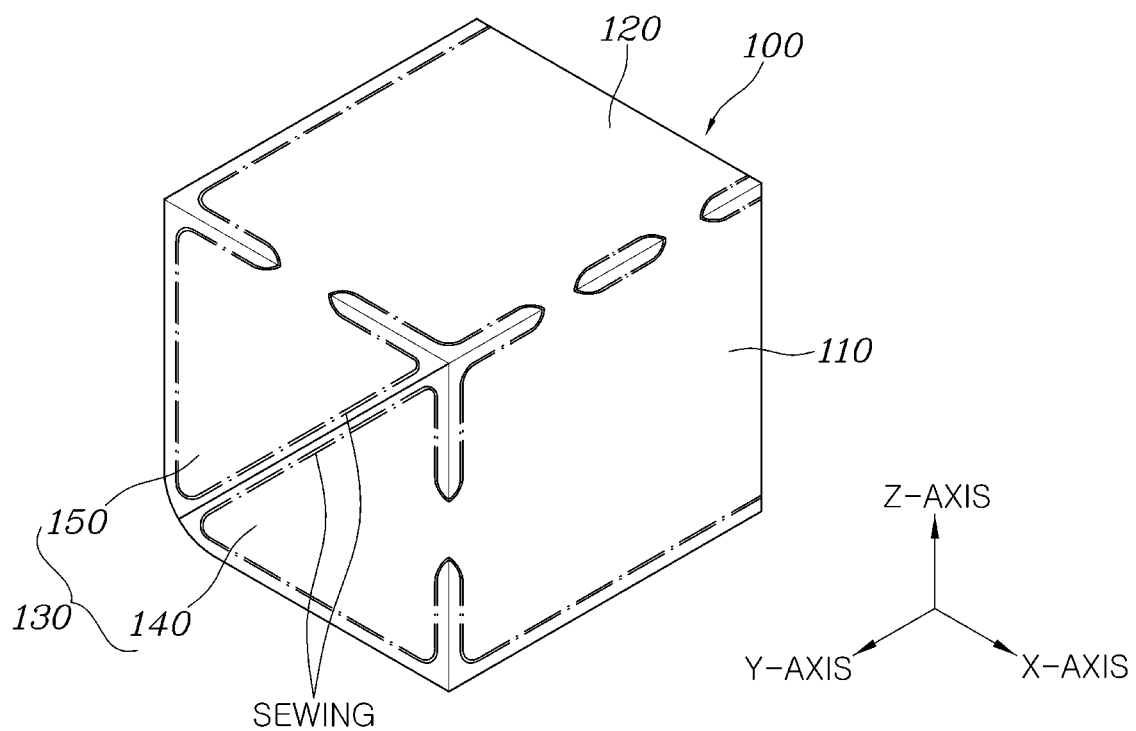
FIG. 2 is a view showing a state in which an airbag cushion according to a first embodiment of the present invention is inflated and deployed.

FIG. 2 is a view showing a state in which an airbag cushion according to a first embodiment of the present invention is inflated and deployed.

Referring to the drawing, the first axis direction may be a leftward-rightward direction of the seat, the second axis direction may be an upward-downward direction of the seat, and the third axis direction may be a forward-backward direction of the seat.

In the first embodiment, the first chamber 110 covers the side portion of each of the shoulders, the second chamber 120 covers the upper portion of each of the shoulders, and the third chamber 130 covers the front portion of each of the shoulders.

In detail, the first chamber 110 is formed in a rectangular shape to cover the side portion of each of the shoulders of the occupant.

The second chamber 120 extends from the upper end of the first chamber 110 in the lateral direction toward the occupant and is formed in a rectangular shape to cover the upper portion of each of the shoulders of the occupant.

The first extended chamber 140 of the third chamber 130 extends from the front end of the first chamber 110 in the lateral direction toward the occupant so as to cover a part of the front portion of each of the shoulders of the occupant.

The second extended chamber 150 of the third chamber 130 extends from the front end of the second chamber 120 in the downward direction toward the occupant so as to cover the remaining part of the front portion of each of the shoulders of the occupant, which is not covered by the first extended chamber 140 extending from the first chamber 110.

Figure 3:
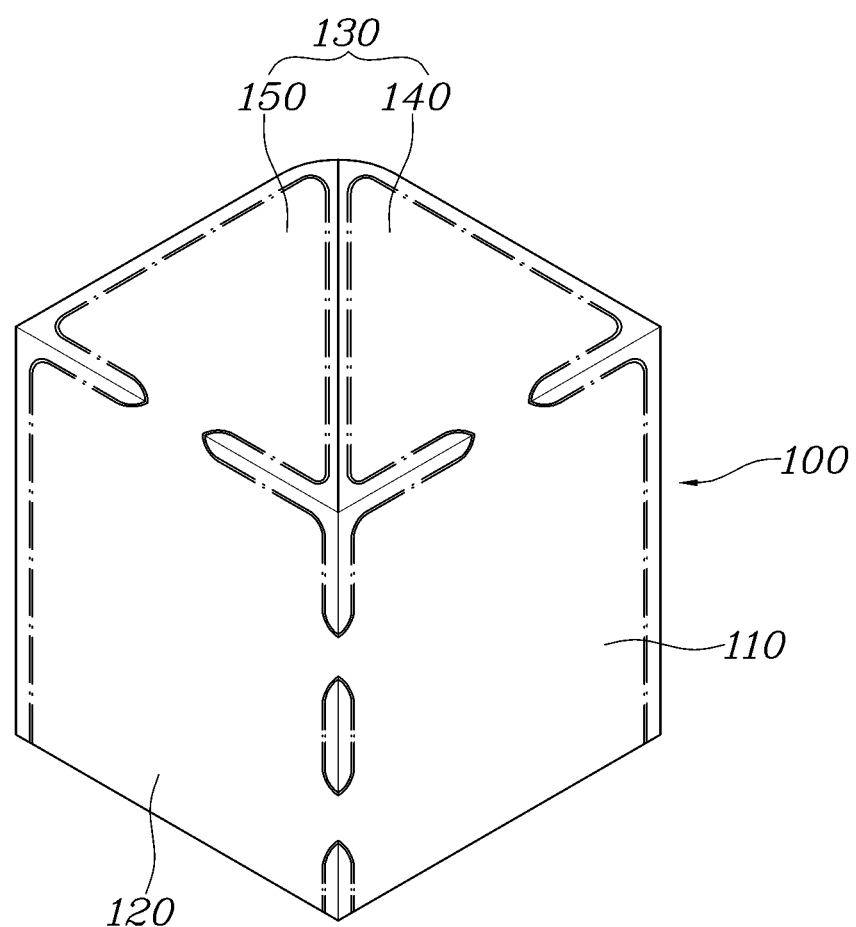
FIG. 3 is a view showing a state in which an airbag cushion according to a second embodiment of the present invention is inflated and deployed.

FIG. 3 is a view showing a state in which an airbag cushion according to a second embodiment of the present invention is inflated and deployed.

Referring to the drawing, the first axis direction may be the leftward-rightward direction of the seat, the second axis direction may be the forward-backward direction of the seat, and the third axis direction may be the upward-downward direction of the seat.

In the second embodiment, the first chamber 110 covers the side portion of each of the shoulders, the second chamber 120 covers the front portion of each of the shoulders, and the third chamber 130 covers the upper portion of each of the shoulders.

In detail, the first chamber 110 is formed in a rectangular shape to cover the side portion of each of the shoulders of the occupant.

The second chamber 120 extends from the front end of the first chamber 110 in the lateral direction toward the occupant and is formed in a rectangular shape to cover the front portion of each of the shoulders of the occupant.

The first extended chamber 140 of the third chamber 130 extends from the upper end of the first chamber 110 in the lateral direction toward the occupant so as to cover a part of the upper portion of each of the shoulders of the occupant.

The second extended chamber 150 of the third chamber 130 extends from the upper end of the second chamber 120 in the backward direction toward the occupant so as to cover the remaining part of the upper portion of each of the shoulders of the occupant, which is not covered by the first extended chamber 140 extending from the first chamber 110.

In the present invention, the first extended chamber 140 extending from the first chamber 110 and the second extended chamber 150 extending from the second chamber 120 may be fixed to each other along edges thereof that contact each other, thereby forming the third chamber 130.

In detail, each of the first extended chamber 140 and the second extended chamber 150 is formed in the shape of a right triangle, and the hypotenuse portion of the first extended chamber 140 and the hypotenuse portion of the second extended chamber 150 are fixed to each other by sewing, thereby forming the third chamber 130 having a rectangular shape.

In the configuration of the first embodiment, the third chamber 130 covers the front portion of each of the shoulders of the occupant. In the configuration of the second embodiment, the third chamber 130 covers the upper portion of each of the shoulders of the occupant.

The present invention may be configured such that gas is first supplied to the first chamber 110 and such that the first chamber 110, the second chamber 120, and the third chamber 130 communicate with each other so that the airbag cushion 100 is inflated.

An inflator 200 is connected to the first chamber 110 configured to cover the side portion of each of the shoulders. Gas generated by explosion of the inflator 200 is first supplied to the first chamber 110.

Hole-shaped communication portions H are formed in boundaries between the chambers.

After gas is first supplied to the first chamber 110 covering the side portion of each of the shoulders, the gas in the first chamber 110 is supplied to the second chamber 120 and the first extended chamber 140 through the communication portions H. Subsequently, the gas in the second chamber 120 is supplied to the second extended chamber 150 through the communication portions H. As a result, the entirety of the airbag cushion 100 is inflated and deployed.

In the present invention, the first chamber 110, the second chamber 120, and the third chamber 130 may be folded with respect to each other such that the first chamber 110 and the second chamber 120 are perpendicular to each other, the second chamber 120 and the third chamber 130 are perpendicular to each other, and the third chamber 130 and the first chamber 110 are perpendicular to each other.

In an example, referring to FIG. 2, the second chamber 120 is folded toward the occupant at a right angle from the upper end of the first chamber 110 covering the side portion of each of the shoulders of the occupant, thereby covering the upper portion of each of the shoulders of the occupant.

The third chamber 130 is folded toward the occupant at a right angle from the front end of the first chamber 110 to cover the front portion of each of the shoulders of the occupant. In this case, the third chamber 130 is in a state of being folded downward at a right angle from the front end of the second chamber 120.

In another example, referring to FIG. 3, the second chamber 120 is folded toward the occupant at a right angle from the front end of the first chamber 110 covering the side portion of each of the shoulders of the occupant, thereby covering the front portion of each of the shoulders of the occupant.

The third chamber 130 is folded toward the occupant at a right angle from the upper end of the first chamber 110 to cover the upper portion of each of the shoulders of the occupant. In this case, the third chamber 130 is in a state of being folded backward at a right angle from the upper end of the second chamber 120.

Alternatively, in the present invention, the first chamber 110, the second chamber 120, the first extended chamber 140, and the second extended chamber 150 may be folded with respect to each other such that the first chamber 110 and the second chamber 120 are perpendicular to each other, the first chamber 110 and the first extended chamber 140, which extends from the first chamber 110, are perpendicular to each other, and the second chamber 120 and the second extended chamber 150, which extends from the second chamber 120, are perpendicular to each other.

In an example, referring to FIG. 2, the second chamber 120 is folded toward the occupant at a right angle from the upper end of the first chamber 110 covering the side portion of each of the shoulders of the occupant, thereby covering the upper portion of each of the shoulders of the occupant.

The first extended chamber 140 is folded toward the occupant at a right angle from the front end of the first chamber 110 to cover the front portion of each of the shoulders of the occupant.

The second extended chamber 150 is folded downward at a right angle from the front end of the second chamber 120 to cover the front portion of each of the shoulders of the occupant together with the first extended chamber 140.

In another example, referring to FIG. 3, the second chamber 120 is folded toward the occupant at a right angle from the front end of the first chamber 110 covering the side portion of each of the shoulders of the occupant, thereby covering the front portion of each of the shoulders of the occupant.

The first extended chamber 140 is folded toward the occupant at a right angle from the upper end of the first chamber 110 to cover the upper portion of each of the shoulders of the occupant.

The second extended chamber 150 is folded backward at a right angle from the upper end of the second chamber 120 to cover the upper portion of each of the shoulders of the occupant together with the first extended chamber 140.

Figure 4:
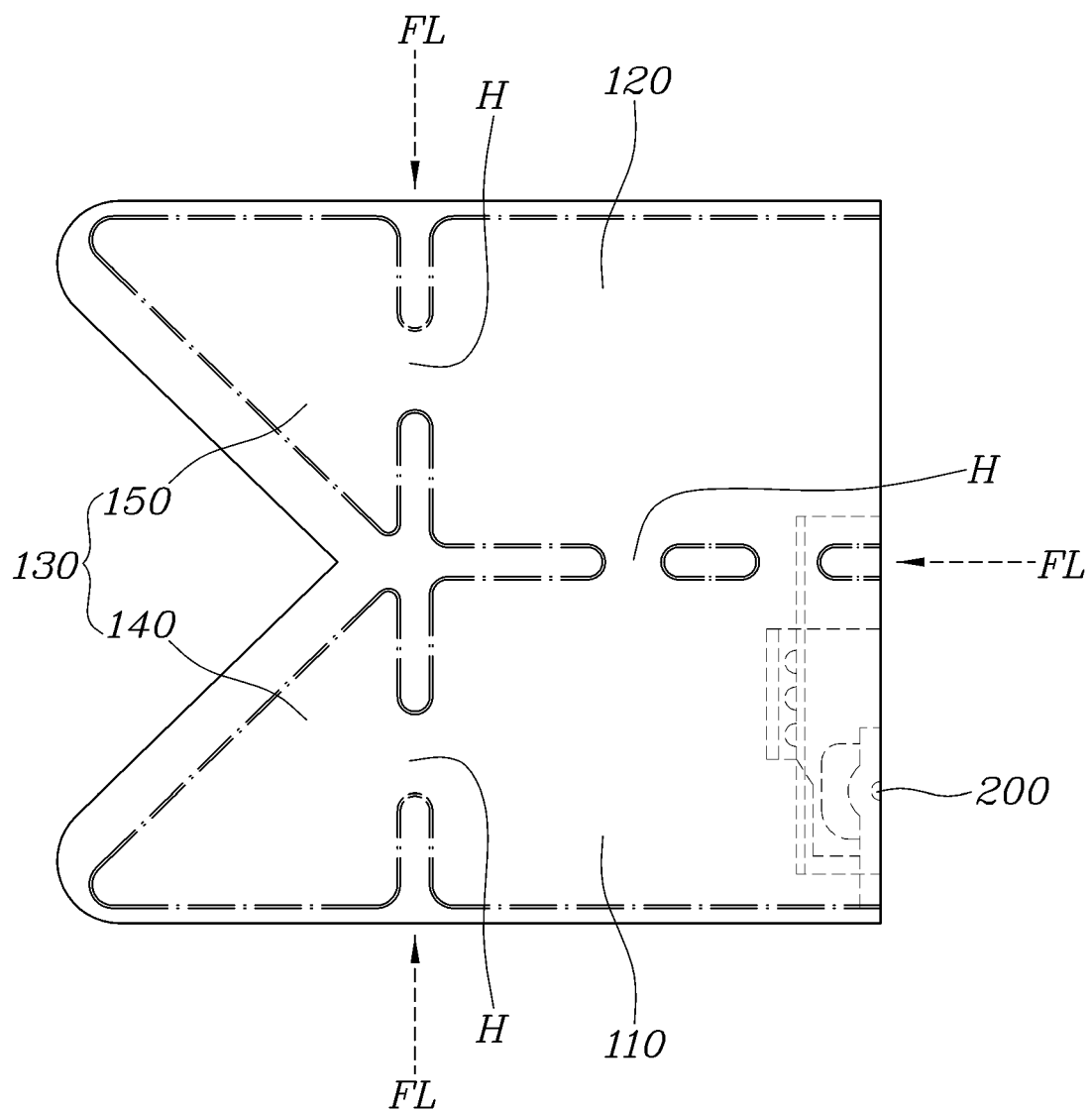
FIG. 4 is a view showing the airbag cushion according to the present invention in an unfolded state.

FIG. 4 is a view showing the airbag cushion 100 according to the present invention in an unfolded state.

Referring to the drawing, the airbag cushion 100 according to the present invention may include a first chamber 110 configured to cover each of the shoulders of an occupant sitting in a seat in a first axis direction, a second chamber 120 formed parallel to the first chamber 110 in the lateral direction and configured to cover each of the shoulders of the occupant in a second axis direction, a first extended chamber 140 extending from the first chamber 110 in a predetermined direction and configured to cover a portion of each of the shoulders of the occupant in a third axis direction, and a second extended chamber 150 extending from the second chamber 120 in a predetermined direction and configured to cover the remaining portion of each of the shoulders of the occupant in the third axis direction, wherein the first extended chamber 140 and the second extended chamber 150 are fixed to each other along edges thereof that face each other.

The edge of the first extended chamber 140 and the edge of the second extended chamber 150 that face each other are formed obliquely relative to each other so as to face each other and are fixed to each other.

The first chamber 110 and the first extended chamber 140 may be formed symmetrically with the second chamber 120 and the second extended chamber 150.

Due to this structure, when vehicle collision occurs, the airbag cushion 100 is inflated and deployed in such a manner that the first chamber 110, the second chamber 120, the first extended chamber 140, and the second extended chamber 150 are folded along a folding line FL formed between the first chamber 110 and the second chamber 120, a folding line FL formed between the first chamber 110 and the first extended chamber 140, and a folding line FL formed between the second chamber 120 and the second extended chamber 150.

The first chamber 110, the second chamber 120, the first extended chamber 140, and the second extended chamber 150 communicate with each other along the folding line FL formed between the first chamber 110 and the second chamber 120, the folding line FL formed between the first chamber 110 and the first extended chamber 140, and the folding line FL formed between the second chamber 120 and the second extended chamber 150.

Since the oblique edge of the first extended chamber 140 and the oblique edge of the second extended chamber 150 are fixed to each other, the airbag cushion 100 is inflated in a three-dimensional shape in such a manner that the first chamber 110 and the second chamber 120 are folded with respect to each other, the first chamber 110 and the first extended chamber 140 are folded with respect to each other, and the second chamber 120 and the second extended chamber 150 are folded with respect to each other.

Accordingly, the first chamber 110 covers the side portion of each of the shoulders of the occupant, the second chamber 120 covers the upper portion of each of the shoulders of the occupant, and the first extended chamber 140 and the second extended chamber 150, which constitute the third chamber 130, cover the front portion of each of the shoulders of the occupant. In this way, the airbag cushion 100 covers each of the shoulders of the occupant in the three axis directions, thereby safely protecting the occupant.

As is apparent from the above description, according to the present invention, when vehicle collision occurs behind a seatback, a chamber covering the upper portion of each of the shoulders of an occupant prevents a phenomenon that the occupant is moved upward along the seatback, i.e. ramping-up behavior of the occupant, and a chamber covering the front portion of each of the shoulders of the occupant prevents the occupant from being pushed in a direction away from the seatback.

Accordingly, it is possible to eliminate not only the risk of injury due to the ramping-up behavior of the occupant but also the risk of injury due to forward movement of the occupant away from the seat, thus safely protecting the occupant.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A shoulder airbag comprising:
    an airbag cushion mounted in a seatback, the airbag cushion being configured to be deployed so as to cover a shoulder of an occupant sitting in a seat in three axis directions,
    wherein the airbag cushion comprises:
        a first chamber shaped to cover the shoulder in a first axis direction;
        a second chamber shaped to cover the shoulder in a second axis direction; and
        a third chamber including:
            a first portion extending from the first chamber shaped to cover a portion of the shoulder in a third axis direction, and
            a second portion extending from the second chamber and shaped to cover a remaining portion of the shoulder in the third axis direction, and
    wherein, when the airbag cushion is deployed, the first chamber, the second chamber, and the third chamber are folded with respect to each other such that the first chamber and the second chamber are perpendicular to each other, the first chamber and the first portion extending from the first chamber are perpendicular to each other, and the second chamber and the second portion extending from the second chamber are perpendicular to each other.

2. The shoulder airbag according to claim 1, wherein, when the airbag cushion deploys, the airbag cushion covers a front portion, a side portion, and an upper portion of each the shoulder of the occupant.

3. The shoulder airbag according to claim 1, wherein the first portion and the second portion are fixed to each other along a boundary therebetween to form the third chamber.

4. The shoulder airbag according to claim 1, wherein the first chamber is configured to cover a side portion of the shoulder, the second chamber is configured to cover an upper portion of the shoulder, and the third chamber is configured to cover a front portion of the shoulder.

5. The shoulder airbag according to claim 1, wherein the first chamber is configured to cover a side portion of the shoulder, the second chamber is configured to cover a front portion of the shoulder, and the third chamber is configured to cover an upper portion of the shoulder.

6. The shoulder airbag according to claim 1, wherein the first chamber is configured to receive gas to inflate the airbag cushion, and wherein the first chamber, the second chamber and the third chamber are in fluid communication with each other such that gas introduced into the first chamber inflates the airbag cushion.

7. The shoulder airbag according to claim 1, wherein, when the airbag cushion is deployed, the first chamber, the second chamber, and the third chamber are folded with respect to each other such that the first chamber and the second chamber are perpendicular to each other, the second chamber and the third chamber are perpendicular to each other, and the third chamber and the first chamber are perpendicular to each other.

8. An airbag cushion of a shoulder airbag, the airbag cushion comprising:

a first chamber configured to cover a shoulder of an occupant sitting in a seat in a first axis direction;

a second chamber formed parallel to the first chamber in a lateral direction and configured to cover the shoulder of the occupant in a second axis direction;

a first extended chamber extending from the first chamber in a predetermined direction and configured to cover a portion of the shoulder of the occupant in a third axis direction; and a second extended chamber extending from the second chamber in a predetermined direction and configured to cover a remaining portion of the shoulder of the occupant in the third axis direction, wherein the first extended chamber and the second extended chamber have edges via which the first extended chamber and the second extended chamber are fixed together, wherein the airbag cushion is inflated and deployed in such a manner that the first chamber, the second chamber, the first extended chamber, and the second extended chamber are folded respectively along a folding line formed between the first chamber and the second chamber, a folding line formed between the first chamber and the first extended chamber, and a folding line formed between the second chamber and the second extended chamber.

9. The airbag cushion according to claim 8, wherein the edges are formed obliquely relative to each other so as to face each other.

10. An airbag cushion of a shoulder airbag, the airbag cushion comprising:

a first chamber configured to cover a shoulder of an occupant sitting in a seat in a first axis direction;

a second chamber formed parallel to the first chamber in a lateral direction and configured to cover the shoulder of the occupant in a second axis direction;

a first extended chamber extending from the first chamber in a predetermined direction and configured to cover a portion of the shoulder of the occupant in a third axis direction; and a second extended chamber extending from the second chamber in a predetermined direction and configured to cover a remaining portion of the shoulder of the occupant in the third axis direction, wherein the first extended chamber and the second extended chamber have edges via which the first extended chamber and the second extended chamber are fixed together, and wherein the first chamber, the second chamber, the first extended chamber, and the second extended chamber fluidly communicate with each other along a folding line formed respectively between the first chamber and the second chamber, a folding line formed between the first chamber and the first extended chamber, and a folding line formed between the second chamber and the second extended chamber.

* * * * *